United States Patent
Kleppner et al.

(10) Patent No.: US 6,293,256 B1
(45) Date of Patent: Sep. 25, 2001

(54) FUEL DELIVERY DEVICE

(75) Inventors: Stephan Kleppner, Bretten; Kurt Frank, Schorndorf; Steffen Mihatsch, Ludwigsburg; Klaus-Dieter Hufnagel, Moeglingen; Guenter-Paul Ballier, Oberriexingen; Albert Gerhard, Tamm; Gerhard Jauch, Markgroeningen, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/423,331

(22) PCT Filed: Dec. 30, 1998

(86) PCT No.: PCT/DE98/03814

§ 371 Date: Nov. 5, 1999

§ 102(e) Date: Nov. 5, 1999

(87) PCT Pub. No.: WO99/52732

PCT Pub. Date: Oct. 21, 1999

(30) Foreign Application Priority Data

Apr. 11, 1998 (DE) .............................. 198 16 317

(51) Int. Cl.⁷ .................................................. F02M 37/10
(52) U.S. Cl. ................................... 123/509; 137/152
(58) Field of Search ................................. 123/509, 514; 417/151; 137/152, 565.22

(56) References Cited

U.S. PATENT DOCUMENTS 4,911,134 * 3/1990 Olsson ............................... 123/514
5,050,567 * 9/1991 Suzuki .............................. 123/509
5,396,872 * 3/1995 Rüger et al. ..................... 123/514
5,527,163 * 6/1996 Werkmann et al. .............. 417/181
5,979,485 * 11/1999 Tuckey et al. .................... 137/143

FOREIGN PATENT DOCUMENTS 42 19 516 A1  12/1993 (DE) .
4333969-A  *  4/1996 (DE) .

* cited by examiner

Primary Examiner—Willis R. Wolfe
Assistant Examiner—Arnold Castro
(74) Attorney, Agent, or Firm—Michael J. Striker

(57) ABSTRACT

The fuel delivery device (12) has a receptacle (16) arranged in a storage tank (10) and a delivery unit (20) delivering fuel from the receptacle (16) to the internal combustion engine (14) of a motor vehicle. Further, there is provided at least one suction jet pump (40) which delivers fuel from the storage tank (10) into the receptacle (16). The suction jet pump (40) is fastened to an upper edge area (17) of the receptacle (16) as a separate constructional unit. The suction jet pump (40) is formed by a constructional unit having a propelling nozzle (41), a connection (43) for a propelling line (44), which connection (43) opens into the propelling nozzle (41), a mixing pipe (42) following the propelling nozzle (41), and a connection (45) for a suction line (46), which connection (45) opens into the mixing pipe (42). Two walls (48) located at a distance from one another project downward from the constructional unit (40), and the constructional unit (40) is mounted on the edge (17) of the receptacle (16) from the top, wherein the edge (17) of the receptacle (16) is introduced between the two walls (48). The suction line (46) connected to the suction jet pump (40) opens into the storage tank (10) remote of the receptacle (16).

9 Claims, 4 Drawing Sheets

FUEL DELIVERY DEVICE

BACKGROUND OF THE INVENTION

1. Description of the Prior Art

The invention is directed to a fuel delivery device according to the generic part of claim 1.

A fuel delivery device of the type mentioned above is known from DE 42 19 516 A1, This fuel delivery device serves to deliver fuel from a storage tank to the internal combustion engine of a motor vehicle. A receptacle from which a delivery unit delivers fuel to the internal combustion engine is arranged in the storage tank. A plurality of suction jet pumps through which fuel is delivered from the storage tank to the receptacle are integrated in the receptacle. Suction lines are connected to the suction jet pumps and open out at various locations in the storage tank. This ensures that the receptacle can be reliably filled with fuel even when the storage tank is relatively empty and when there is an uneven distribution of fuel in the storage tank, for example, as a result of the vehicle ascending a grade or driving along a curve. This construction of the fuel delivery device is disadvantageous because it requires a special construction of the receptacle with the suction jet pumps integrated therein which is costly to produce.

2. Advantages of the Invention

The fuel delivery device according to the invention with the features according to claim 1 has the advantage over the prior art that the receptacle can be constructed in a simple manner and the suction jet pump can be attached to the receptacle, also as a retrofit, as a separate constructional unit. A conventional receptacle can be used for this purpose, and the suction jet pump can be attached thereto subsequently. The fuel delivery device according to the invention with the features of claim 5 likewise has the advantage over the prior art that the receptacle and the closure element can be constructed in a simple manner and the suction jet pump can be attached to the closure element, also subsequently, as a separate constructional unit.

Advantageous constructions and further developments of the fuel delivery device according to the invention are indicated in the dependent claims.

DRAWING

Several embodiment examples of the invention are shown in the drawing and explained more fully in the following description.

DESCRIPTION OF THE EMBODIMENT EXAMPLES

Figure 1:
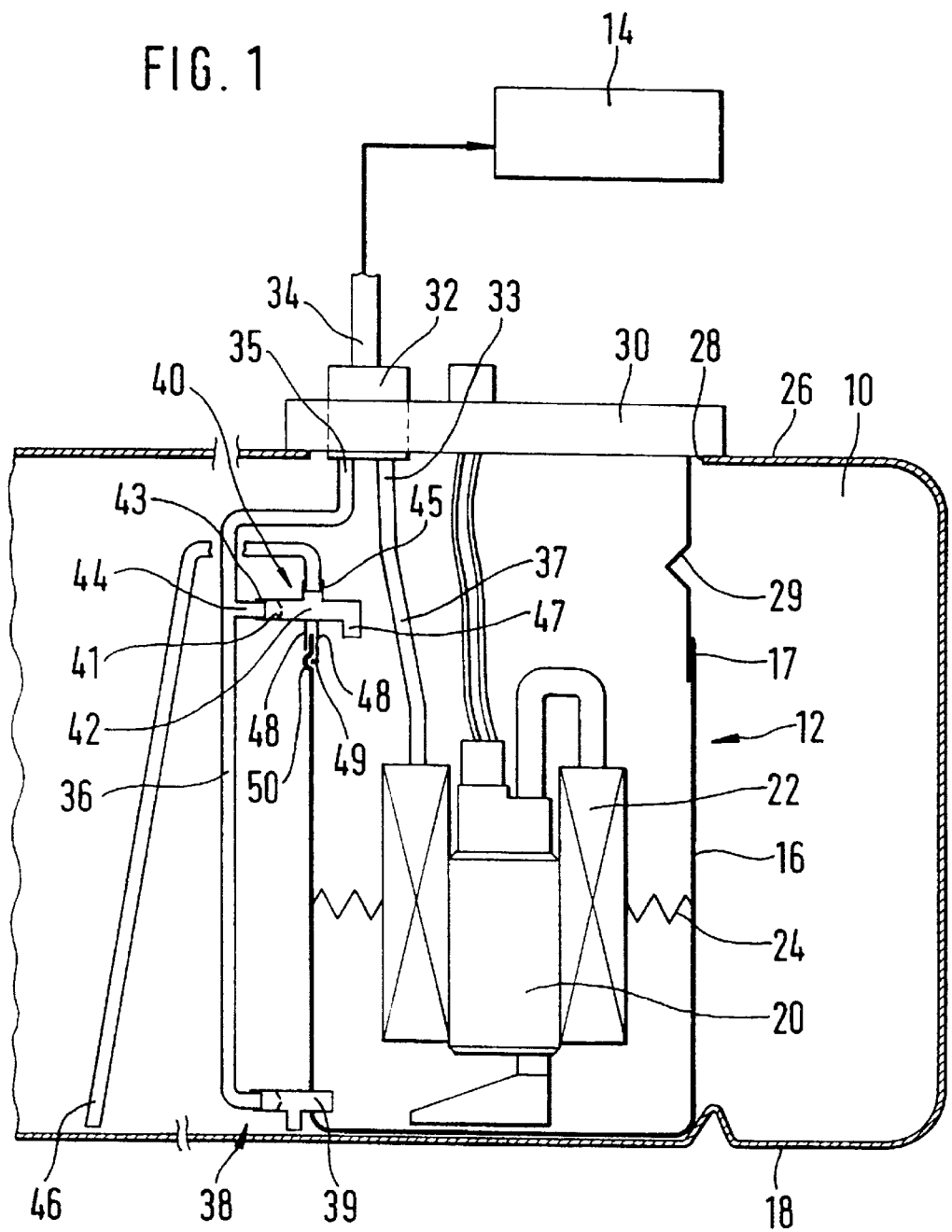
FIG. 1 is a sectional view showing a storage tank with a fuel delivery device according to a first embodiment example in vertical longitudinal section.
Figure 2:
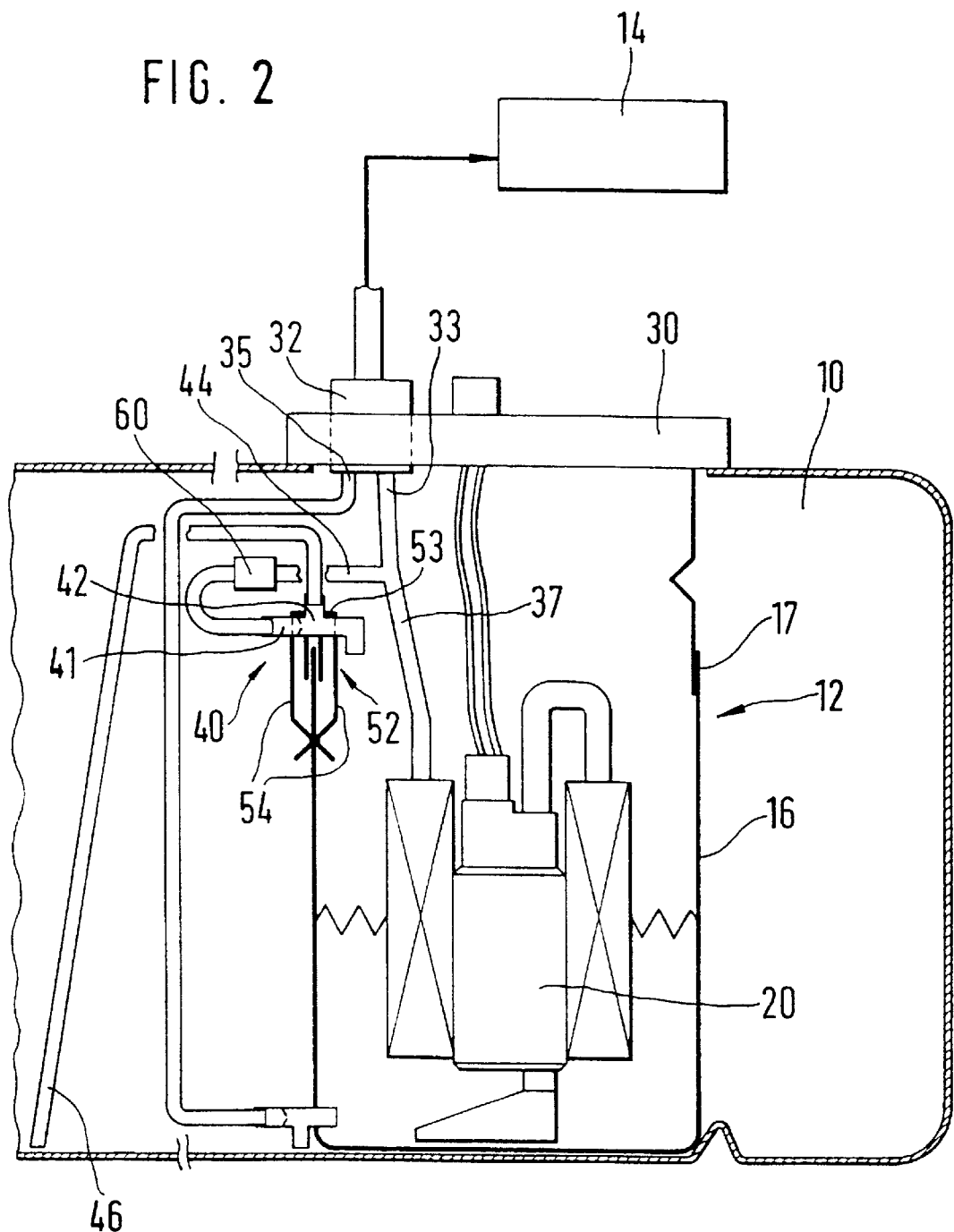
FIG. 2 shows the fuel delivery device according to a second embodiment example.
Figure 3:
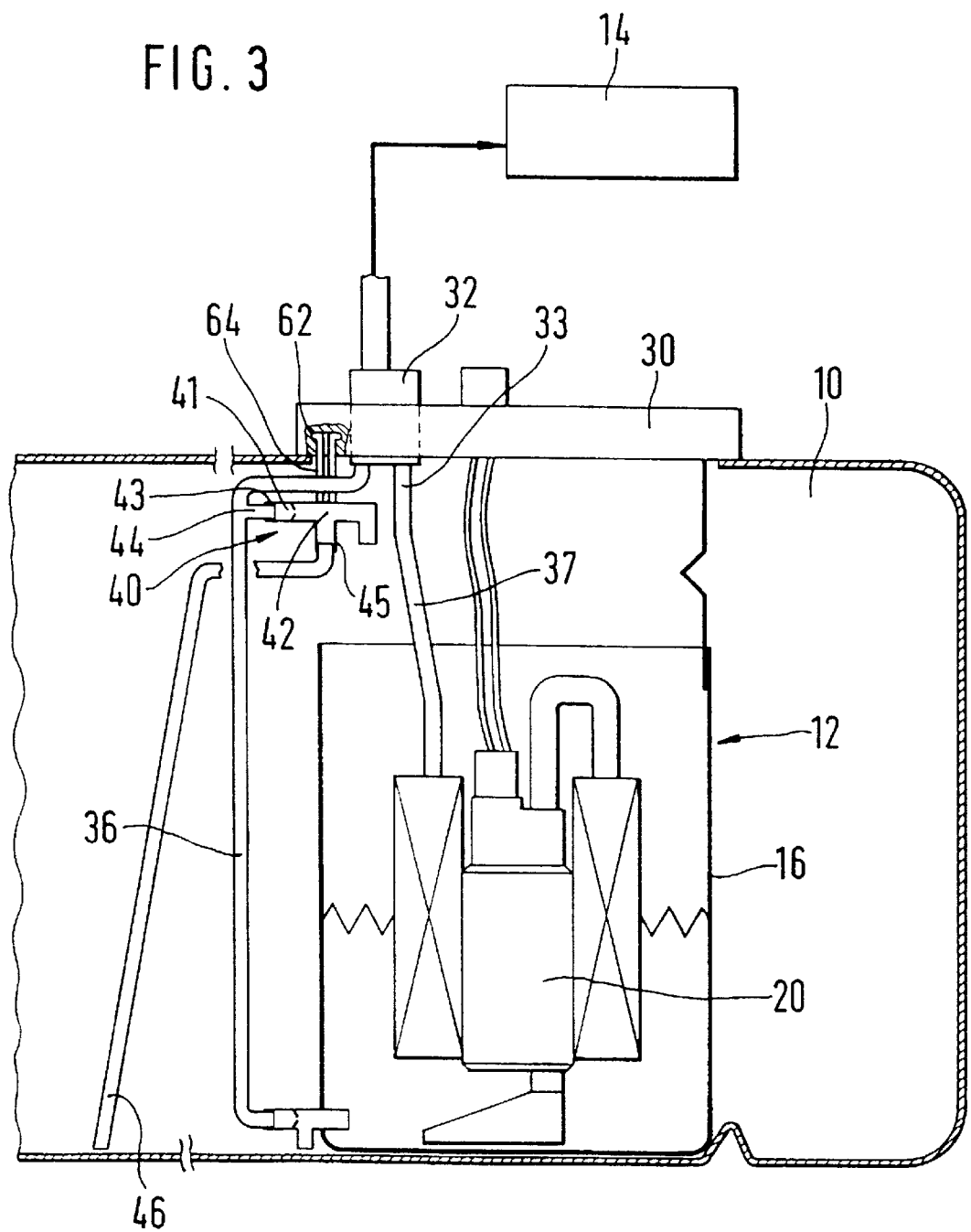
FIG. 3 shows the fuel delivery device according to a third embodiment example.

FIGS. 1 to 3 show a fuel storage tank 10 of a motor vehicle in section, a fuel delivery device 12 for delivering fuel from the storage tank 10 to the fuel injection system of the internal combustion engine 14 of the motor vehicle being arranged therein. The fuel delivery device 12 has a pot-shaped receptacle 16 which fits on a base 18 of the storage tank 10 and can be fixed to the base 18 in a manner not shown in more detail. The receptacle 16 can be made of fuel-resistant plastic, for example, and is open at its upper end. A delivery unit 20 which sucks fuel out of the receptacle 16 during operation and delivers it to the internal combustion engine 14 is installed in the receptacle 16. The delivery unit 20 has a pump part and a motor part which drives the latter, especially with an electric drive motor. Further, a filter 22 can be arranged in the receptacle 16. The fuel delivered by the delivery unit 20 is filtered through the filter 22 before being delivered to the internal combustion engine 14. The filter 22 can be arranged in the receptacle 16 so as to enclose the delivery unit 20. The delivery unit 20 can be mounted in the receptacle 16 via vibration-damping elements 24.

The storage tank 10 has an opening 28 in an upper wall 26, through which the receptacle 16, with the delivery unit 20 arranged therein, can be introduced into the storage tank 10. The opening 28 can be closed by means of a closure element 30 in the form of a flange. Hydraulic and/or electric lines for connecting the delivery unit 20 with the internal combustion engine 14 or with a current source for supplying the drive motor of the delivery unit 20 can be guided through the closure element 30. A springing element 29 can be installed between the closure element 30 and the receptacle 16, wherein the receptacle 16 is pressed against the base 18 of the storage tank 10 by means of the springing element 29.

FIG. 1 shows the fuel delivery device 12 according to a first embodiment example. A pressure regulator 32 is arranged at the closure element 30; this pressure regulator 32 has an inlet 33 connected with the delivery side or pressure side of the delivery unit 20, an outlet 34 connected with the internal combustion engine 14, and a return 35 which opens into the storage tank 10 and through which the amount of fuel delivered by the delivery unit 20 is reduced in a controlled manner when a determined pressure is exceeded. As an alternative to this arrangement, the pressure regulator 32 can also be arranged close to the internal combustion engine 14, wherein a return line leads from the pressure regulator 32 to the storage tank 10, and fuel which is cut off in a controlled manner by the pressure regulator 32 can flow back through this return line into the storage tank 10. A line 36 running in the storage tank 10 is connected to the return 35 of the pressure regulator 32. The inlet 33 of the pressure regulator 32 is connected, via a line 37, with the pressure side of the delivery unit 20.

A suction jet pump 40 is attached to the upper edge 17 of the receptacle 16 as a separate constructional unit. The suction jet pump 40 is formed by a constructional unit having a propelling nozzle 41, a mixing pipe 42 following the latter, a connection 43 for a propelling line 44, which connection 43 opens into the propelling nozzle 41, and a connection 45 for a suction line 46, which connection 45 opens into the mixing pipe 42. The end area 47 of the mixing pipe 42 can be bent downward. The connections 43 and 45 of the constructional unit are constructed as necks or connection pieces to which the propelling line 44 and suction line 46 are attached. The propelling line 44 connected to the connection 43 of the constructional unit of the suction jet pump 40 can branch off from the line 36 connected to the return 35 of the pressure regulator 32 or can be formed by the line 36 itself. The line 36 and the propelling line 44 can be constructed as rigid or flexible pipes, or corrugated pipes, as they are called, of plastic or metal or as flexible hoses. The suction line 46 connected with the connection 45 opening into the mixing pipe 42 can likewise be constructed as a rigid or flexible pipe or as a flexible hose. The suction line 46 opens into the storage tank 10 at a location close to the base 18 of the storage tank 10 and at a distance from the receptacle 16. In particular, the suction line 46 opens out close to a rear edge of the storage tank 10 viewed in the driving direction of the vehicle, at which edge the fuel located in the storage tank 10 collects when the vehicle ascends a grade.

The construction unit forming the suction jet pump 40 is preferably made of fuel-resistant plastic and can be produced in one piece, in particular by injection molding. The constructional unit forming the suction jet pump 40 has two walls 48 which project downward from this constructional unit at a distance from one another in the radial direction with respect to the receptacle 16 corresponding to the wall thickness of the receptacle 16 and which are curved corresponding to the curvature of the wall of the receptacle 16. The constructional unit 40 is attached to the edge 17 of the receptacle 16 from above in such a way that the edge 17 of the receptacle 16 is arranged between the walls 48. The radial distance between the two walls 48 of the constructional unit 40 can be somewhat less than the wall thickness of the receptacle 16 so that these walls 48 are pressed apart in a resilient manner when fitted to the edge 17 of the receptacle 16 and a secure holding of the constructional unit 40 at the receptacle 16 is achieved.

In order to further improve the holding of the constructional unit 40 at the receptacle 16, a catch connection shown in FIG. 1 can be provided in addition, wherein, for example, one or both walls 48 of the constructional unit 40 or at least portions thereof are constructed in a springing manner in the radial direction and can snap in in the radial direction at the edge 17 of the receptacle 16. One wall 48, for example, can have a catch projection 49 facing the wall of the receptacle 16, which catch projection 49 can snap into a depression 50 or shoulder of the wall of the receptacle 16. The wall of the receptacle 16 can also have a catch projection and a wall 48 of the constructional unit 40 can have a depression or shoulder at which the catch projection can engage.

The line 36 connected to the return 35 of the pressure regulator 32 can be guided up close to the base 18 of the storage tank 10 and be connected at that location to an additional suction jet pump 38, through which fuel from an area of the storage tank 10 located directly adjacent to the receptacle 16 is delivered through an opening 39 into the receptacle 16.

FIG. 2 shows the fuel delivery device 12 according to a second embodiment example in which its basic construction is not changed from the first embodiment example described above and diverges therefrom only with respect to the portions to be described hereinafter. Alternatively or in addition to the catch connection of the constructional unit 40 at the receptacle 16, the fuel delivery device according to the second embodiment example is provided with a holding element 52 by which the constructional unit forming the suction jet pump 40 is fastened to the edge 17 of the receptacle 16. The holding element 52 is constructed in a clamp-like manner, for example, and can be made of fuel-resistant plastic or metal. The holding element 52 can have, for example, a portion 53 engaging over the constructional unit 40 and one or more arms 54 engaging at the edge 17 of the receptacle 16. The arms 54 can grasp the edge 17 of the receptacle 16, for example, for fastening the constructional unit 40 to the edge 17 of the receptacle 16 when the holding element 52 is made of metal. Alternatively, the holding element 52 can also be fastened to the edge 17 of the receptacle 16 in the manner of a catch.

In the fuel delivery device 12 according to the second embodiment example, in contrast to the first embodiment example, the, propelling line 44 which is connected to the propelling nozzle 41 of the suction jet pump 40 is not connected with the return 35 of the pressure regulator 32 but, rather, branches off from the line 37 connecting the pressure side of the delivery unit 20 to the inlet 33 of the pressure regulator 32. A pressure valve 60 can be arranged in the propelling line 44 such that the pressure valve 60 opens the propelling line 44 only when a determined pressure is exceeded on the pressure side of the delivery unit 20 in order to enable a sufficient amount of fuel to be delivered to the internal combustion engine 14 when the latter is started. This connection of the propelling line 44 with line 37 between the pressure side of the delivery unit 20 and the inlet 33 of the pressure regulator 32 is independent from the fastening of the suction jet pump 40 to the receptacle 16 and can therefore also be provided in the fuel delivery device 12 according to the first embodiment example instead of the connection of propelling line 44 with line 36. The suction line 46 connected to the mixing pipe 42 opens out at a location in the storage tank 10 remote of the receptacle 16.

FIG. 3 shows the fuel delivery device 12 according to a third embodiment example in which the basic construction is, again, the same as in the first embodiment example with the exception of those portions described hereinafter. The suction jet pump 40 is not fastened to the receptacle 16, but to the inside of the closure element 30 facing the storage tank 10. The suction jet pump 40 is constructed as a constructional unit with propelling nozzle 41, mixing pipe 42 and connections 43 and 45 just as in the first embodiment example. The closure element 30 can have, at its inner side, a depression 62 in which a projection 64 projecting upward from the constructional unit forming the suction jet pump 40 can be inserted and held therein in a frictional and/or positive engagement, for example, in that the projection 64 is compressed in a springing manner or by means of a catch connection. Alternatively, the closure element 30 can also have, projecting from its inner side, a projection to which the constructional unit forming the suction jet pump 40 can be fastened in a positive and/or frictional engagement. The closure element 30 is generally constructed in such a way that the constructional unit forming the suction jet pump 40 can be fastened thereto in a simple manner, wherein a separate holding element can also be provided for fastening the suction jet pump 40 as in the second embodiment example. The propelling nozzle 41 of the suction jet pump 40 is connected, via its connection 43, with the propelling line 44 which is connected in turn with the return line 36 of the pressure regulator 32 or with the line 37 between the pressure side of the delivery unit 20 and the inlet 33 of the pressure regulator 32. The suction line 46 of the suction jet pump 40 connected to the mixing pipe 42 opens into the storage tank 10 remote of the receptacle 16.

Figure 4:
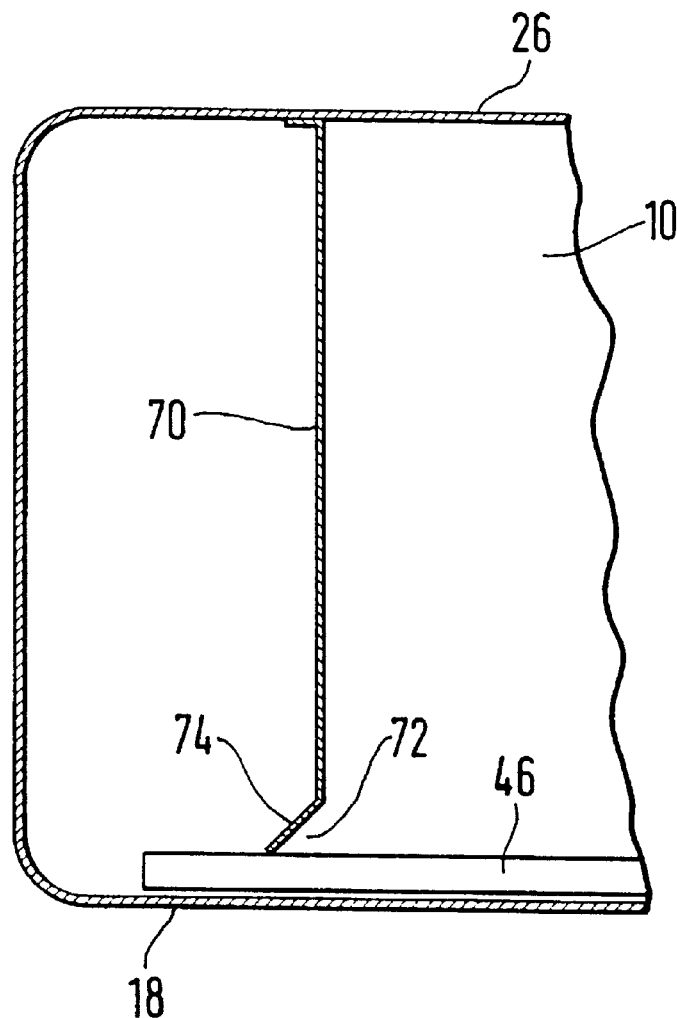
FIG. 4 shows the storage tank in vertical longitudinal section.
Figure 5:
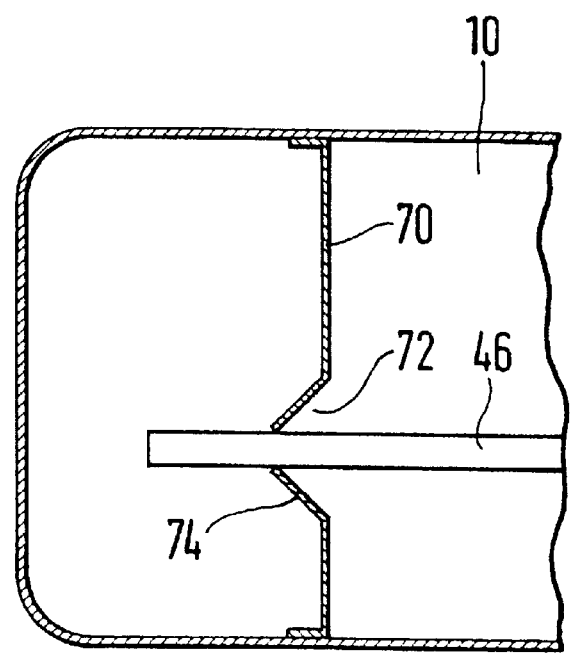
FIG. 5 shows the storage tank in horizontal longitudinal section.

In FIGS. 4 and 5, the storage tank 10 is shown in longitudinal sections in an area remote of the receptacle 16. A vertical or standing wall 70, as it is called, is introduced in the storage tank 10 and extends between the base 18 and the upper wall 26 of the storage tank 10. The standing wall 70 has an opening 72 which allows the suction line 46 of the suction jet pump 40 to pass through. The opening 72 can be arranged close to the base 18 of the storage tank 10, and the suction line 46 can be arranged between the standing wall 70 and the base 18 of the storage tank 10. The opening 72 can be provided with an insertion bevel 74 to facilitate insertion of the suction line 46. The suction line 46 is fixed in position by the standing wall 70 so that it opens out in the intended area of the storage tank 10 and fuel is delivered from this area through the suction jet pump 40 into the receptacle 16. The suction line 46 is somewhat movable in its longitudinal direction relative to the standing wall 70 so that longitudinal deviations of the suction line 46 can be compensated.

What is claimed is:

1. Full, deliver device for delivering full from a storage tank (10) to the internal combustion engine (14) of a motor vehicle, comprising a receptacle (16) arranged in the storage tank (10), a delivery unit (20) delivering fuel from the receptacle (16) to the internal combustion engine (14), and at least on suction jet pump (40) which delivers fuel from the storage tank (10) into the receptacle (16) and which is arranged in the receptacle (16), wherein the receptacle (16) has an upper edge area and said at least one suction jet pump (40) is a seperate construction unit which is fastened to the upper edge (17) of the receptacle (16).

2. Fuel delivery device according to claim 1, wherein the suction jet pump (40) is mounted on a wall of the receptacle (16) at the upper edge area (17).

3. Fuel delivery device according to claim 1, wherein the suction jet pump (40) is fastened to the upper edge area of the receptacle (16) by means of a catch connection (49, 50).

4. Fuel delivery device according to claim 1, wherein the suction jet pump (40) is fastened to the upper edge area of the receptacle (16) by means of an additional holding element (52).

5. Fuel delivery device for delivering fuel from a storage tank (10) to the internal combustion engine (14) of a motor vehicle, comprising a receptacle (16) arranged in the storage tank (10), a delivery unit (20) delivering fuel from the receptacle (16) to the internal combustion engine (14), and at least one suction jet pump (40) which delivers fuel from the storage tank (10) into the receptacle (16), wherein the storage tank (10) has in an upper wall thereof at least one opening (28) through which the receptacle (16) is introduced into the storage tank (10) and which is covered by a closure element (30), and wherein said at least one suction jet pump (40) is a separate constructional unit which is fastened to an inner side of the closure element (30) facing into the storage tank (10).

6. Fuel delivery device according to claim 5, wherein the suction jet pump (40) is fastened to the closure element (30) by means of a catch connection.

7. Fuel delivery device according to claim 5, wherein the suction jet pump (40) is fastened to the closure element (30) by means of an additional holding element.

8. Fuel delivery device according to claim 1, wherein the suction jet pump (40) comprising a constructional unit has a propelling nozzle (41), a mixing pipe (42) following the latter, a connection (43) for a propelling line (44), which connection (43) opens into the propelling nozzle (41), and a connection (45) for a suction line (46), which connection (45) opens into the mixing pipe (42).

9. Fuel delivery device according to claim 8, wherein the constructional unit of the suction jet pump (40) is constructed in one piece and is produced from plastic by injection molding.

\* \* \* \* \*